N. I. MILLIKEN.
PLOW.
APPLICATION FILED APR. 15, 1911.
1,018,397.
Patented Feb. 20, 1912.
2 SHEETS—SHEET 1.
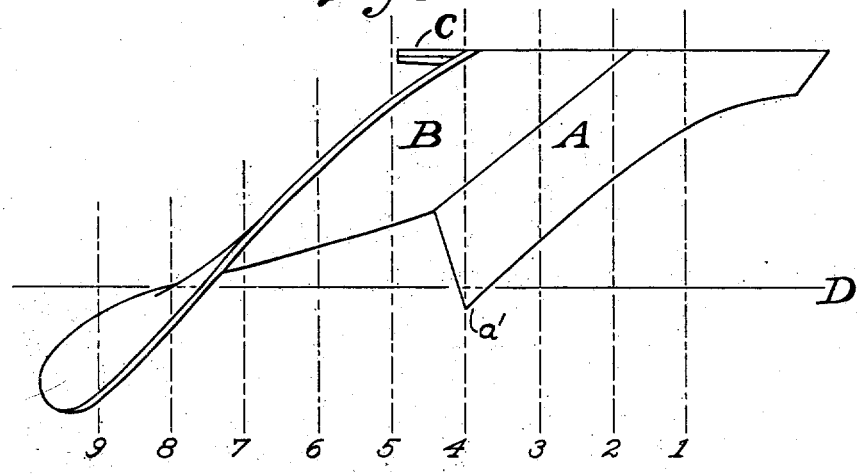
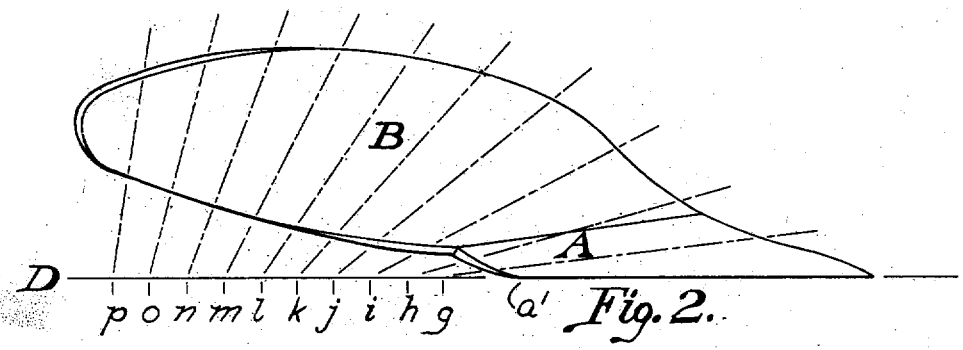

N. I. MILLIKEN.
PLOW.
APPLICATION FILED APR. 15, 1911.

1,018,397.

Patented Feb. 20, 1912.
2 SHEETS—SHEET 2.

UNITED STATES PATENT OFFICE.

NORMAN I. MILLIKEN, OF JANESVILLE, WISCONSIN, ASSIGNOR TO THE JANESVILLE MACHINE CO., OF JANESVILLE, WISCONSIN, A CORPORATION OF WISCONSIN.

PLOW.

1,018,397.

Specification of Letters Patent.

Patented Feb. 20, 1912.

Application filed April 15, 1911. Serial No. 621,200.

*To all whom it may concern:*

Be it known that I, NORMAN I. MILLIKEN, a citizen of the United States, residing at Janesville, in the county of Rock, State of Wisconsin, have invented certain new and useful Improvements in Plows; and I do hereby declare the following to be a full, clear, and exact description of the invention, such as will enable others skilled in the art to which it appertains to make and use the same.

This invention relates to certain improvements in plows of the moldboard type and has for its object to provide a simple and efficient structural formation and combination of parts whereby a very effective and economical turning of the soil is attained.

It has further for its object a structural formation and combination of parts whereby its operation is efficient in a great variety of soils.

A further object is to provide a formation of working surfaces and parts, whereby, the raising up and turning of the soil is distributed evenly over the entire length of contact, and a smooth and complete furrow is obtained under any speed of travel.

This combination and formation of parts has a further object, to raise up and turn the soil without lifting the inner side or wall and without tearing the soil and by a purely rolling movement, by bending, so that the furrow is folded into a sector as it is rolled.

A further object is to throw considerable of the weight of the furrow on its inner and bottom side, by folding the outer side of the furrow before or by the time the wing of the share has cut the inner edge loose and to continue the turning operation of the furrow without lifting this inner edge, so as to prevent the furrow from sliding away from the mold-board during completion of the operation.

The result of this combination is a considerable saving of draft or power and an evenly distributed wear or work over the contact surface, a smooth, steady operating plow, a perfectly turned and loosened soil under any practical conditions of speed and soil. All as will hereinafter more fully appear.

Figure 3:
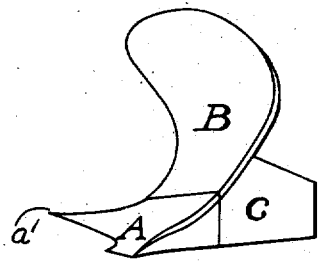
Figure 4:
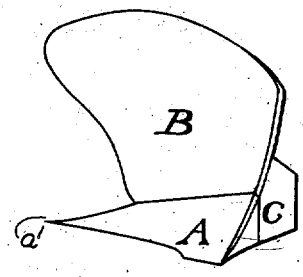
Figure 5:
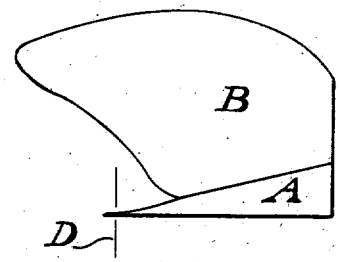
Figure 6:
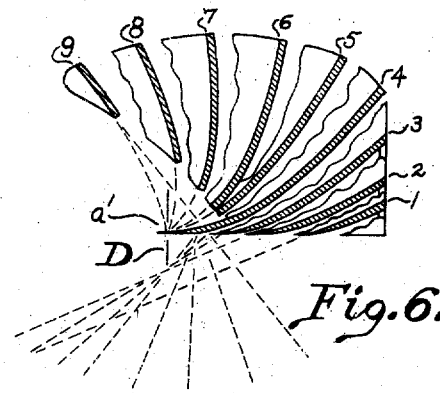

In the accompanying drawings Figure 1 is a top view, Fig. 2 is a side elevation, Figs. 3 and 4 are perspective views, Fig. 5 is a front elevation and Fig. 6 front vertical sectional views of Fig. 1 on lines 1 to 9 inclusive.

In the figures, A is the share, B the moldboard, C the landside and $a'$ the wing or point of the share, D represents approximately the inside wall of the furrow or the width of furrow the plow should cut.

Referring to Fig. 6 and the sectional views thereof, the curves radiate substantially from the share wing $a'$ or more strictly speaking from the inner bottom corner of the furrow as indicated by dotted curved lines. Now while these curves are not perfect ones, they are single and gradual and none of them reverse and all do radiate from within the furrow bottom, or cross the furrow bottom between the landside C and the share point $a'$. The furrow will assume the shape indicated by these sections or curves successively beginning at 1 and ending at 9. When the furrow slice is at the point 4, Fig. 1, its bottom surface assumes the shape of the section 4 of Fig. 6. Considerable of the weight of the furrow would after it passes the point indicated by 4, Fig. 1, be on the inner lower corner and as the inner edge has not been lifted the operation of folding and turning continues until completed, with a purely rolling and folding movement. The added weight on the inside lower corner prevents the furrow from sliding away from the moldboard.

To more fully describe my invention, the line D, Fig. 2 is divided into substantially equal spaces $g, h, i, j, k, l, m, n, o, p$. Radiating from each of these points a straight line would intersect the outer and inner edges of the working surface of the moldboard and share. Between each of these intersecting points the moldboard B and share A would be substantially straight and lie parallel to the said lines. In other words, there are straight surfaces at every point on the turning or working surface of the moldboard and share. A straight line lying across the straight surface would, if extended, touch the bottom inner corner of the furrow to be turned, which furrow corner is represented approximately by D of Figs. 2 and 6. These lines which intersect on the outer edge of A and B beginning at A, preferably gradually decrease in distance toward the rear end of the moldboard substantially as indicated.

Referring again to Fig. 6 and the straight dotted lines it will be noted that each section forms an arc whose chord intersects below and inside the line D or properly speaking the inside lower corner of the furrow. Now if any one of these arcs should intersect above and outside of the share wing $a'$ then the furrow could not turn by a perfect rolling motion and the lower surface of the furrow would assume the shape of a reverse curve and the soil would be lifted or the weight on the furrow at D reduced. There would also be excessive wear at this point at the bottom surface of moldboard B and a tendency to throw the soil away from the upper and outer edge of the moldboard. With this invention the furrow is rolled upon itself and over, without lifting or tearing. Loosening of the soil is caused by bending and not by tearing or shearing as in other plows.

I do not wish to be understood as confining myself to mathematical exactness, when referring to a point, line, curve, etc. I mean within a reasonable or practical degree or within what is, in the art of plow making, considered a reasonable or safe degree of accuracy.

Having thus described my invention, what I claim as new and desire to secure Letters Patent on is—

1. In a plow the combination of a moldboard, a share, said moldboard having for its entire length edges and curves in a transverse vertical plane describing an arc whose chord crosses the bottom line of said plow within said share as and for the purpose specified.

2. In a plow the combination of a moldboard, a share, a share point and a landside, the shape of said moldboard in a transverse vertical plane describing an arc whose chord intersects the bottom of the furrow between said share point and said landside, substantially as specified.

3. In a plow the combination of a moldboard, a share, said moldboard for its entire length, having curves, in a transverse vertical plane describing an arc whose chord intersects or crosses the bottom of the furrow to be turned.

4. In a plow the combination of, a share, a moldboard, said moldboard having a sweep whereby the curvature of its entire working surface on a transverse vertical plane describes single curves whose lines, if extended without reversing, would intersect the lower inner corner of the furrow to be turned, as and for the purpose specified.

5. In a plow the combination of a share, a moldboard, said share and moldboard having substantially straight lines on their entire working or turning surfaces which do not intersect each other but radiate from the inner bottom corner of the furrow to be turned, and at substantially even intervals, said lines touching the landside edge of said share and moldboard at points whose distance from one another gradually decreases, beginning at said share, as and for the purpose specified.

6. In a plow, the combination of a moldboard, a share, said moldboard and share having straight lines or surfaces on their entire turning surface which do not intersect each other but do radiate from the bottom inner corner of the furrow to be turned, as and for the purpose specified.

NORMAN I. MILLIKEN.

Witnesses:
LOUISE A. MANN,
GEO. H. DRUMMOND.